(12) United States Patent
Turgut et al.

(10) Patent No.: US 9,880,305 B2
(45) Date of Patent: Jan. 30, 2018

(54) METHOD OF PASSIVE ACOUSTIC DEPTH DETERMINATION IN SHALLOW WATER

(71) Applicants: Altan Turgut, Annandale, VA (US); Laurie T. Fialkowski, La Plata, MD (US)

(72) Inventors: Altan Turgut, Annandale, VA (US); Laurie T. Fialkowski, La Plata, MD (US)

( * ) Notice: Subject to any disclaimer, the term of this patent is extended or adjusted under 35 U.S.C. 154(b) by 777 days.

(21) Appl. No.: 14/508,162

(22) Filed: Oct. 7, 2014

(65) Prior Publication Data

US 2015/0098306 A1 Apr. 9, 2015

Related U.S. Application Data

(60) Provisional application No. 61/888,128, filed on Oct. 8, 2013.

(51) Int. Cl.
*G01V 1/00* (2006.01)
*G01V 1/38* (2006.01)

(52) U.S. Cl.
CPC .................... *G01V 1/38* (2013.01)

(58) Field of Classification Search
CPC ................ G01V 1/38; G01V 1/001
See application file for complete search history.

(56) References Cited

U.S. PATENT DOCUMENTS

| 3,069,654 A | 12/1962 | Hough | |
| 2015/0098306 A1* | 4/2015 | Turgut | G01V 1/38 |
| | | | 367/131 |
| 2015/0346726 A1* | 12/2015 | Davoodi | B63B 22/24 |
| | | | 701/21 |

OTHER PUBLICATIONS

Peterson, et al., The theory of signal detectability, Transactions IRE Profession Group on Information Theory, 1954, PGIT-4, 171-212, IEEE, USA.

(Continued)

*Primary Examiner* — Daniel Pihulic

(57) ABSTRACT

A method of acoustic depth determination in shallow water. At least one standard acoustic sensor located below an ocean thermocline is provided. The at least one acoustic sensor operates at a first frequency regime and at a second frequency regime. The first frequency regime is above a cut-off frequency. The second frequency regime is below the cut-off frequency. Acoustic data from a moving broadband noise source is recorded at the at least one acoustic sensor. A plot of acoustic intensity as a function of frequency versus time is generated from the acoustic data. A first waveguide invariant density distribution for the first frequency regime and a second waveguide-invariant density distribution for the second frequency regime is generated from the plot using curve detection. Whether the noise source is located below the thermocline is classified based on the first and second waveguide-invariant density distributions.

14 Claims, 5 Drawing Sheets

(56) References Cited

OTHER PUBLICATIONS

Baggeroer, et al., Matched Field Processing: Source Localization in Correlated Noise as an Optimum Parameter Estimation Problem, J. Acoust. Soc. Am., Feb. 1988, pp. 571-587, vol. 83 (2), Acoustical Society of America, USA.

Premus, et al., Modal Scintillation Index: A Physics-based Statistic for Acoustic Source Depth Discrimination, J. Acoust. Soc. Am., Apr. 1999, pp. 2170-2180, vol. 105 (4), Acoustical Society of America, USA.

Premus, et al, Mode Filtering Approaches to Acoustic Source Depth Discrimination, 2004 Coference Record of the Thirty-Eigth Asilomar Conference on Signals, Systems and Computers, 2004, pp. 1415-1420, vol. 2., IEEE, USA.

* cited by examiner

METHOD OF PASSIVE ACOUSTIC DEPTH DETERMINATION IN SHALLOW WATER

CROSS-REFERENCE TO RELATED APPLICATIONS

This application claims priority to U.S. Provisional Patent Application Ser. No. 61/888,128, entitled "METHOD AND APPARATUS OF PASSIVE ACOUSTIC DEPTH DETERMINATION IN SHALLOW WATER," to Turgut et al., which was filed on 8 Oct. 2013 and is incorporated herein by reference.

BACKGROUND OF THE INVENTION

Field of the Invention

This invention relates generally to a method for acoustic depth discrimination in shallow water having a thermocline, and more particularly to a method for determining whether a distant sound source is near the surface or submerged in the water using a single hydrophone or a horizontal hydrophone array.

Description of the Related Art

Current approaches for depth classification are based on Matched Field Processing ("MFP") and its extensions to more robust methods, such as acoustic mode scintillation and acoustic mode filtering. (See, e.g., A. B. Baggeroer, W. A. Kuperman, Henrik Schmidt, "Matched field processing, Source localization in correlated noise as an optimum parameter estimation problem," J. Acoust. Soc. Am. 83(2), 571-587, 1988; V. E. Premus, "Modal scintillation index: A physics based statistic for acoustic source discrimination," J. Acoust. Soc. Am. 105(4), 2170-2180, 1999; and V. E. Premus, J. Ward, and C. D. Richmond, "Mode filtering approaches to acoustic source depth discrimination," *IEEE Underwater Acoustic Signal Processing Workshop.* 1415-1420, 2004, all three articles being incorporated herein by reference). The MFP algorithms require precise knowledge of the propagation environmental parameters, including the geoacoustic properties (e.g. sediment sound-speed, density, and attenuation). In practice, range and depth estimation by MFP-based methods becomes problematic due to insufficient knowledge of the environmental parameters. Mode-scintillation and mode-filtering methods seek to reduce the acoustic source localization problem to a two-class discrimination problem. The mode-scintillation method exploits the high or low Scintillation Index ("SI") property of acoustic modes generated by a near-surface or a submerged source, respectively. Similarly, the mode-filtering method seeks to discriminate low or high order acoustic modes generated by a near-surface or a submerged source, respectively. Both methods require either densely populated vertical hydrophone arrays, or horizontal arrays that are carefully placed in the water column so as to be away from ocean boundaries. Neither of these requirements is practical nor considered for existing surveillance systems. In addition, both methods require water column sound-speed profile information, as well as the critical angle of the seabed. Development of a more robust depth-discrimination method that requires minimum environmental information and uses acoustic data from existing surveillance systems is highly desirable; these are systems such as horizontal hydrophone arrays or single-hydrophone sensors of distributed networks.

BRIEF SUMMARY OF THE INVENTION

An embodiment of the invention includes a method of acoustic depth determination in shallow water. In this embodiment, at least one standard acoustic sensor located in an ocean layer below an ocean thermocline is provided. The at least one acoustic sensor operates at a first frequency regime and at a second frequency regime. The first frequency regime is above a cut-off frequency of the ocean layer below the thermocline. The second frequency regime is below the cut-off frequency of the ocean layer below the thermocline. Acoustic data from a moving broadband noise source is recorded at the at least one acoustic sensor. A plot of acoustic intensity as a function of frequency versus time is generated from the acoustic data. A first waveguide invariant density distribution for the first frequency regime and a second waveguide-invariant density distribution for the second frequency regime are generated from the plot using standard curve detection. Whether the noise source is located below the thermocline is classified based on the first waveguide-invariant density distribution and the second waveguide-invariant density distribution.

Another embodiment of the invention includes another method of acoustic depth determination in shallow water. In this embodiment, a first standard acoustic sensor located in an ocean layer above an ocean thermocline and a second standard acoustic sensor located in the ocean layer below the ocean thermocline are provided. The first acoustic sensor and the second acoustic sensor operate at a same frequency regime. The frequency regime is above a cut-off frequency of the ocean layer below the thermocline. Acoustic data from a moving broadband noise source is recorded at the first acoustic sensor and at the second acoustic sensor. Plots of acoustic intensity as a function of frequency versus time are generated from the acoustic data. A first waveguide-invariant density distribution for the first acoustic sensor and a second waveguide-invariant density distribution for the second acoustic sensor are generated from the plots using standard curve detection. Whether the noise source is located below the thermocline is classified based on the first waveguide-invariant density distribution and the second waveguide-invariant density distribution.

Advantageously, an embodiment of the invention performs classifications multiples quicker than prior art methods of depth discrimination. For instance, whereas this embodiment of the invention classifies a noise source as being above or below an ocean thermocline in less than one minute on a low-power CPU, conventional MFP methods often take twenty to sixty minutes to make their classifications. Therefore, this embodiment of the invention provides near-real-time classification, and it is more appropriate to be implemented in an autonomous system with a low-power CPU.

Advantageously, waveguide-invariant distributions such as employed in an embodiment of the invention are not affected by temporal oceanographic variability. By contrast, prior art methods are often affected by temporal oceanographic variability that limit their classification performance.

Advantageously, an embodiment of the invention uses minimum environmental information that is available from archival data. In this embodiment, the only information needed for depth discrimination is total water depth and depth of the ocean thermocline that exists from early spring to late fall of the year.

DETAILED DESCRIPTION OF THE INVENTION

Figure 1:
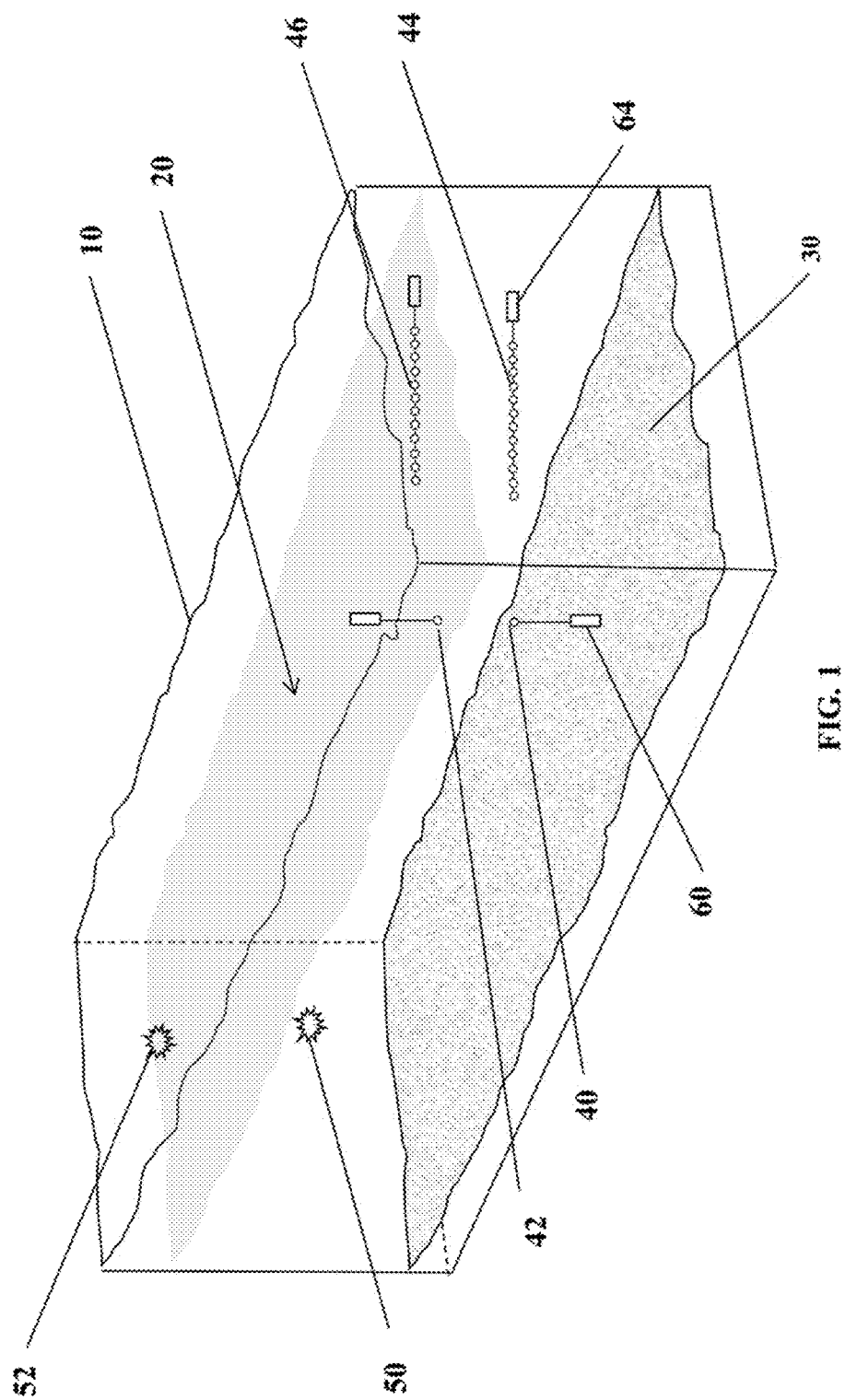
FIG. 1 is an illustrative perspective view of illustrative sensors in a body of water according to an embodiment of the instant invention.
Figure 2B:
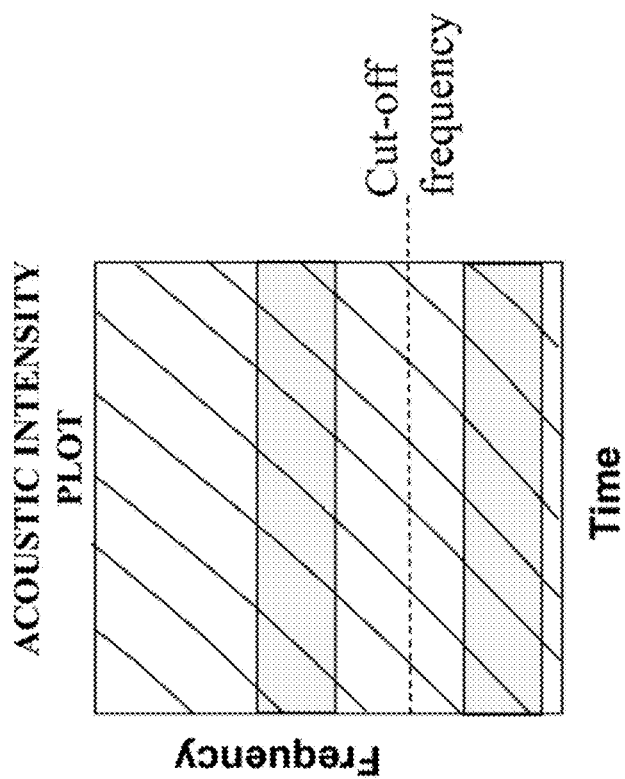
FIG. 2B is an illustrative acoustic intensity plot for an illustrative noise source in an ocean layer above an ocean thermocline being detected by an embodiment of the instant invention having at least one standard acoustic sensor located in an ocean layer below an ocean thermocline and operating at a first frequency regime and at a second frequency regime.
Figure 2A:
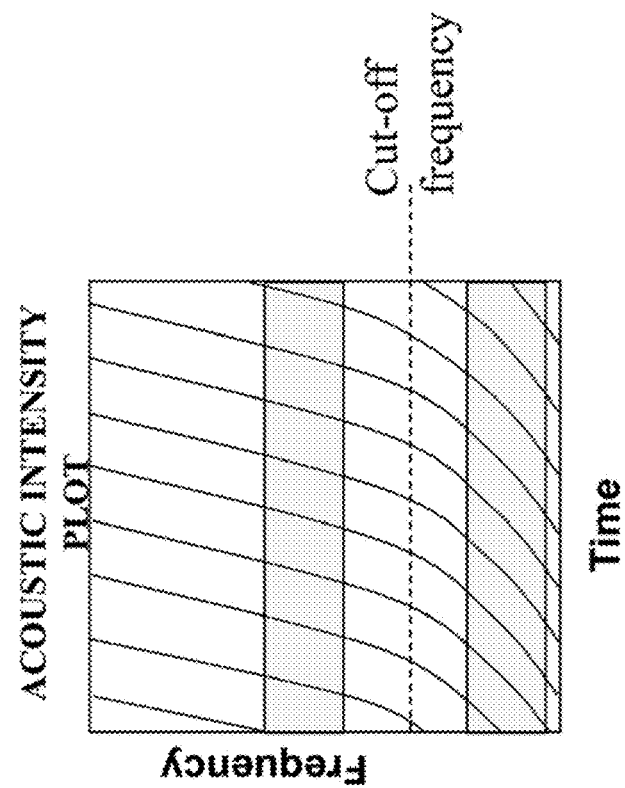
FIG. 2A is an illustrative acoustic intensity plot for an illustrative noise source in an ocean layer below an ocean thermocline being detected by an embodiment of the instant invention having at least one standard acoustic sensor located in an ocean layer below an ocean thermocline and operating at a first frequency regime and at a second frequency regime.
Figure 3:
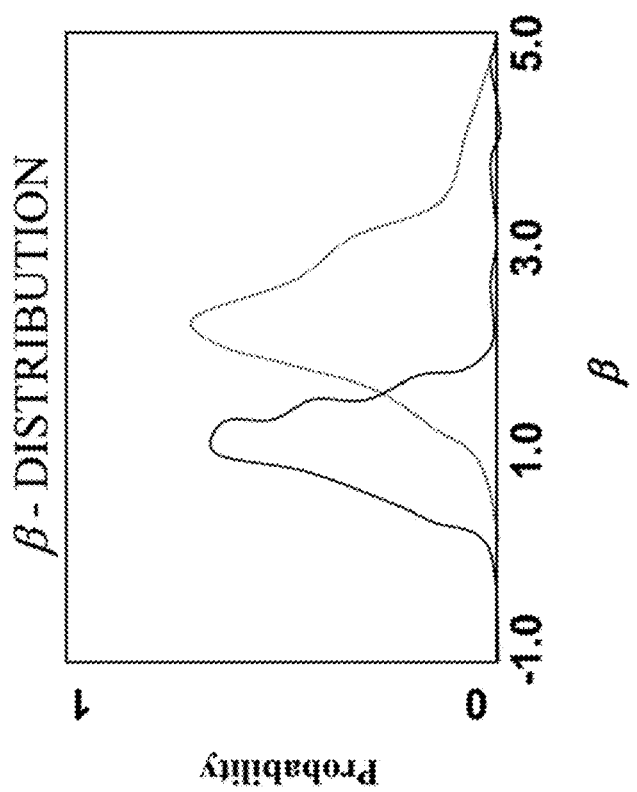
FIG. 3 is an illustrative graph of a first waveguide invariant density distribution for the first frequency regime and a second waveguide-invariant density distribution for the second frequency regime, according to an embodiment of the instant invention.

An embodiment of the invention includes a method of acoustic depth determination in shallow water. FIG. 1 shows an illustrative column or block of a body of water such as an ocean. The block of a body of water includes a water surface 10, an ocean thermocline 20, and a seafloor 30. In this embodiment, at least one standard acoustic sensor 40, 44 located in a near-bottom layer below an ocean thermocline 20 is provided, such as shown by way of illustration in FIG. 1. For the purposes of this specification, "near-bottom" is defined as being on the seafloor 30, or above the seafloor but below the thermocline. The at least one acoustic sensor 40 operates at a first frequency regime and at a second frequency regime. The first frequency regime is above a cut-off frequency of the near-bottom layer. The second frequency regime is below the cut-off frequency of the near-bottom layer. Acoustic data from a moving broadband noise source of unknown depth is recorded at the at least one acoustic sensor. The moving broad band noise source of unknown depth could be a noise source 50 below the ocean thermocline, or the moving broadband noise source could be a noise source 52 above the ocean thermocline. A plot of acoustic intensity as a function of frequency versus time is generated from the acoustic data. An illustrative acoustic intensity plot for a noise source 50 in the near-bottom layer is shown by way of illustration in FIG. 2A, and an illustrative acoustic intensity plot for a noise source 52 in a near-surface layer is shown by way of illustration in FIG. 2B. For the purposes of this specification, "near-surface" is defined as being below the water surface 10 but above the thermocline 20. In FIGS. 2A and 2B, the first frequency regime and second frequency regime are shown by way of illustration as the shaded region above the cut-off frequency and the shaded region below the cut-off frequency, respectively. A first waveguide invariant density distribution for the first frequency regime and a second waveguide-invariant density distribution for the second frequency regime, such as shown by way of illustration in FIG. 3, is generated from the acoustic intensity plot using standard curve detection. Whether the noise source is located below the thermocline is classified based on the first waveguide-invariant density distribution and the second waveguide-invariant density distribution.

Figure 4:
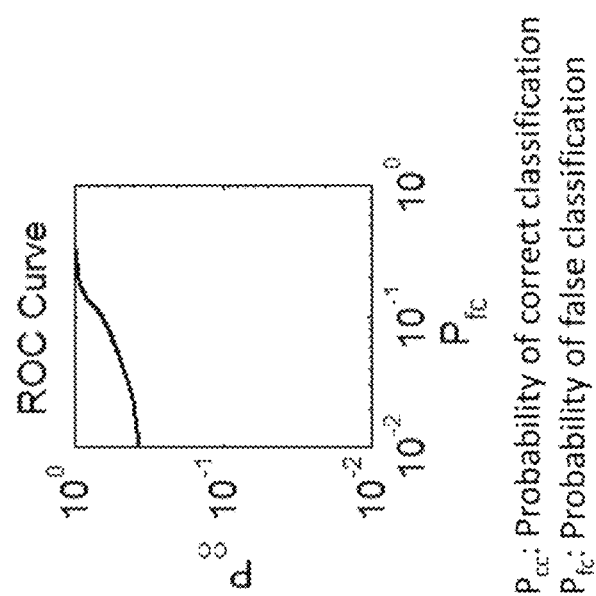
FIG. 4 is an illustrative graph of a Receiver Operating Characteristics curve, according to an embodiment of the instant invention.

Optionally, classifying whether a noise source is located below the thermocline based on the first waveguide-invariant density distribution and the second waveguide-invariant density distribution is performed including the following steps or operations. A Receiver Operating Characteristics curve, such as shown by way of illustration in FIG. 4, is generated from the first waveguide-invariant density distribution and the second waveguide-invariant density distribution. Whether the noise source is located below the thermocline is then classified based on the Receiver Operating Characteristics curve.

Optionally, the at least one acoustic sensor includes a plurality of distributed standard sensors or a standard horizontal sensor array. An example of a plurality of distributed standard sensors includes a standard distributed network of standard single-hydrophone sensors. An example of a horizontal sensor array includes a standard horizontal hydrophone array. Use of a horizontal sensor array advantageously increases the signal-to-noise ratio for ultra-quiet targets. Optionally, the horizontal sensor array is towed by a standard submarine, a standard ship, or a standard automated underwater vehicle.

Optionally, the curve detection includes a standard Radon transform or a standard Hough transform.

Optionally, the thermocline is located in a body of water on at least one continental shelf.

Optionally, the first waveguide-invariant density distribution comprises a first waveguide-invariant density distribution peak and the second waveguide-invariant density distribution comprises a second waveguide-invariant density distribution peak. In such an embodiment of the invention, classifying whether the noise source is located below the thermocline based on the first waveguide-invariant density distribution and the second waveguide-invariant density distribution includes assessing a proximity or remoteness of the first waveguide-invariant density distribution peak to the second waveguide-invariant density distribution peak where proximity or remoteness of peaks is assessed by a Receiver Operating Characteristics curve, defined as the probability of correct classification versus the probability of false classification.

Figure 5A:
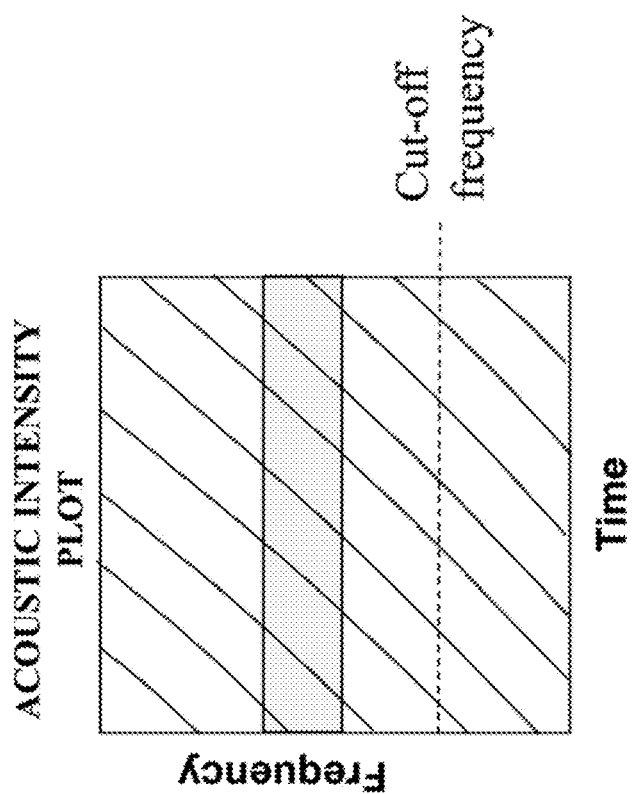
FIG. 5A is an illustrative acoustic intensity plot for an illustrative noise source in an ocean layer below an ocean thermocline being detected by an embodiment of the instant invention having at least one standard acoustic sensor located in an ocean layer below an ocean thermocline, the sensors operating at a same frequency regime.
Figure 5B:
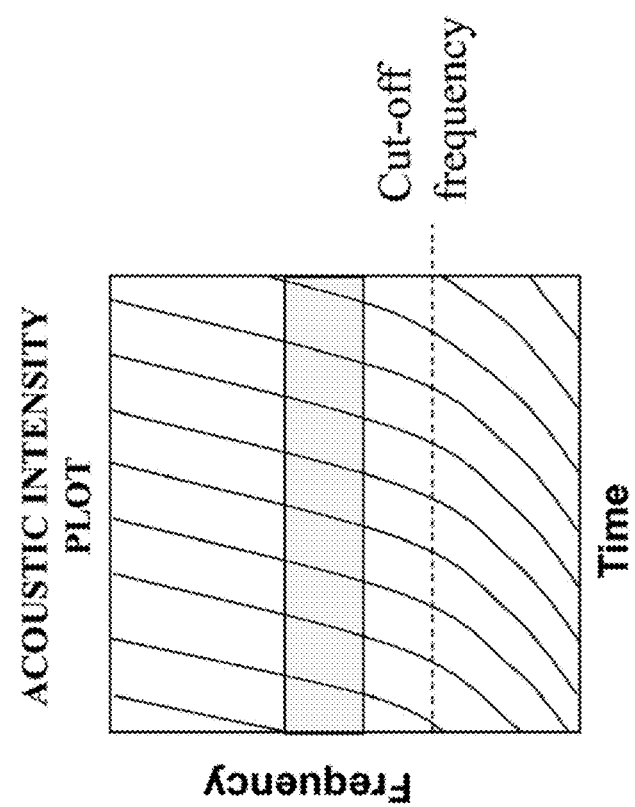
FIG. 5B is an illustrative acoustic intensity plot for an illustrative noise source in an ocean layer below an ocean thermocline being detected by an embodiment of the instant invention having at least one standard acoustic sensor located in an ocean layer above the ocean thermocline, the sensors operating at a same frequency regime.

Another embodiment of the invention includes another method of acoustic depth determination in shallow water. In this embodiment, at least one first standard acoustic sensor located in an ocean layer below an ocean thermocline and at least one second standard acoustic sensor located in the ocean layer above the ocean thermocline are provided. Being in the specified ocean layer is sufficient, and the precise distance to the thermocline does not matter. The first acoustic sensor and the second acoustic sensor operate at a same frequency regime. The frequency regime is above a cut-off frequency of the near-bottom ocean layer. Acoustic data from a moving broadband noise source is recorded at the at least one first acoustic sensor and at the at least one second acoustic sensor. Plots of acoustic intensity as a function of frequency versus time are generated from the acoustic data. An illustrative acoustic intensity plot for a noise source 50 below the thermocline and a first acoustic sensor 40, 44 below the thermocline is shown by way of illustration in FIG. 5A. An illustrative acoustic intensity plot for a noise source 50 below the thermocline and a second acoustic sensor 42, 46 above the thermocline is shown by way of illustration in FIG. 5B. Frequency values in FIGS. 5A and 5B increase, going up the frequency axes. In FIGS. 5A and 5B, the first acoustic sensor below the thermocline and second acoustic sensor above the thermocline, each with a source below the thermocline, are shown by way of illustration as the shaded region above the cut-off frequency, respectively. A first waveguide-invariant density distribution for the first acoustic sensor and a second waveguide-invariant density distribution for the second acoustic sensor are generated from the plots using standard curve detection. Whether the noise source is located below the thermocline is classified based on the first waveguide-invariant density distribution and the second waveguide-invariant density distribution.

Optionally, classifying whether a noise source is located below the thermocline based on the first waveguide-invariant density distribution and the second waveguide-invariant density distribution is performed including the following steps or operations. A Receiver Operating Characteristics curve is generated from the first waveguide-invariant density distribution and the second waveguide-invariant density distribution. Whether the noise source is located below the thermocline is then classified based on the Receiver Operating Characteristics curve.

Optionally, at least one of the at least one first acoustic sensor and the at least one second acoustic sensor includes a plurality of distributed standard sensors and a standard horizontal sensor array. Optionally, the horizontal sensor array is towed by a standard submarine, a standard ship, or a standard automated underwater vehicle.

Optionally, the curve detection includes a standard Radon transform or a standard Hough transform.

Optionally, the thermocline is located in body of water on at least one continental shelf.

Optionally, the first waveguide-invariant density distribution comprises a first waveguide-invariant density distribution peak and the second waveguide-invariant density distribution comprises a second waveguide-invariant density distribution peak. In such an embodiment of the invention, classifying whether the noise source is located below the thermocline based on the first waveguide-invariant density distribution and the second waveguide-invariant density distribution classifying includes assessing a proximity or remoteness of the first waveguide-invariant density distribution peak to the second waveguide-invariant density distribution peak by a Receiver Operating Characteristics curve, defined as the probability of correct classification versus the probability of false classification.

Yet another embodiment of the invention is described as follows. A schematic of the geometry of a depth-classification apparatus in a body of water forming an acoustic waveguide is shown by way of non-limiting illustration in FIG. 1. A broadband noise source above 52 or a broadband noise source below 50 the ocean thermocline 20, is depth discriminated either by a first single-hydrophone sensor 40 below the thermocline or by a first horizontal hydrophone array 44 below the thermocline. This is achieved through the use of broadband noise data within two predetermined frequency bands (as was discussed above relative to FIGS. 2A and 2B). For the single-hydrophone case, processing can be performed autonomously within the single acoustic sensor's standard processor 60. For the hydrophone-array case, processing can be performed either autonomously within the horizontal array's standard processor 64, or by a tow-ship's standard on-board processor.

For a noise source below 50 the thermocline, the slopes of the acoustic intensity striation patterns received on the hydrophone(s) will be different for the frequency bands below the predetermined cut-off frequency than the slopes of the striation patterns above the cut-off frequency (as shown by way of illustration in FIG. 2A). For a noise source above 52 the thermocline 20, there is little change in the slopes of acoustic intensity for the frequency bands below and above the pre-determined cut-off frequency (as shown by way of illustration in FIG. 2B).

In still another embodiment of the invention, a second single sensor 42 or a second horizontal hydrophone array 46 can be deployed (or towed) above the thermocline. In this case, analysis of a frequency band or regime above a predetermined cut-off frequency would be sufficient to discriminate any acoustic noise source within the water column. If the noise source is below the ocean thermocline, slopes of acoustic intensity patterns will be different for the single sensors (or hydrophone arrays) deployed above and below the ocean thermocline (as shown by way of illustration in FIGS. 5A and 5B). If the noise source is above the ocean thermocline, slopes of acoustic intensity patterns will be the same for the single sensors (or hydrophone arrays) deployed above and below the ocean thermocline (as shown by way of illustration in FIG. 5B).

To analyze the properties of the striation patterns (level curves) in the acoustic intensity plots, let I be the observed intensity as a function of frequency ($\omega$) and range from the source (r). The level curves satisfy $$\frac{\partial I}{\partial \omega} d\omega + \frac{\partial I}{\partial r} dr = 0. \tag{1}$$

Solving for the slope $d\omega/dr$ of the striations yields $$\frac{d\omega}{dr} = -\frac{\partial I / \partial r}{\partial I / \partial \omega}. \tag{2}$$

A normal mode representation of the intensity can be used to analyze Eq. (2). For source and receiver depths $z_s$ and $z$, respectively, the associated pressure p is $$p = \sum_m (\xi_m r)^{-1/2} \Psi_m(z_s) \Psi_m(z) e^{i(\xi_m + i\alpha_m)r}, \tag{3}$$

where $\Psi_m$ are the mode functions and $\xi_m$ are the corresponding horizontal wavenumbers. The modal attenuation $\alpha_m$ accounts for bottom loss, and irrelevant scaling terms have been suppressed. It follows that the intensity, $I=|p|^2$, is $$I = \sum_{m,n} A_{mn} \exp(i\Delta\xi_{mn} r). \tag{4}$$

The amplitudes $A_{mn}$ can be derived from (3). Since the striation patterns are usually determined by the rapidly oscillating phase terms, the weak range and frequency dependence in $A_{mn}$ is neglected and the derivatives of the intensity are calculated as $$\frac{\partial I}{\partial r} \approx i\omega \sum_{m,n} A_{mn} \Delta Q_{mn} \exp(i\Delta\xi_{mn}r), \quad (5a)$$

$$\frac{\partial I}{\partial \omega} \approx ir \sum_{m,n} A_{mn} \Delta S_{mn} \exp(i\Delta\xi_{mn}r). \quad (5b)$$

Here $\Delta Q_{mn}=(1/v_m-1/v_n)$ is the mode phase slowness difference with modal phase velocity $v=\omega/\xi$, and $\Delta S_{mn}=(1/u_m-1/u_n)$ is the mode group slowness difference with modal group velocity $u=(\partial\xi/\partial\omega)^{-1}$.

Brekhovskikh and Lysanov give a definition for the waveguide invariant as a derivative of the phase slowness with respect to the group slowness. (See, e.g., Brekhovskikh, L. M., and Lysanov, Y. P., *Fundamentals of Ocean Acoustics*, 2nd edn (New York, Springer), 1991, which is incorporated herein by reference). They caution, however, that this expression applies only to a group of modes, not necessarily all the propagating modes. Making this dependence on mode index explicit, the local invariant $\beta$ for a particular pair of modes is defined herein as $$\beta = -\frac{\Delta Q_{mn}}{\Delta S_{mn}} = -\frac{\Delta\xi_{mn}/\omega}{\partial\Delta\xi_{mn}/\partial\omega}. \quad (6)$$

Equation (6) can be used in (5a) to eliminate the term related to the phase velocities. Combining (2)-(6) yields for the slope of the striations $$\frac{d\omega}{dr} = \beta\frac{\omega}{r}. \quad (7)$$

The waveguide invariant $\beta$ is assumed to be independent of the mode indices m and n. For a standard Pekeris waveguide, the assumption is justified and $\beta \approx 1$, the canonical value for shallow water. For more complicated scenarios, as when there is a significant thermocline in the water column, the numerical values for the various $\beta$ in Eq. (7) can differ by an order of magnitude and might depend on the source and receiver depths.

In a standard Pekeris waveguide, for a given acoustic mode number n, the cut-off frequency is determined as $$f_{n\,cut-off} = \frac{cn}{2H\sqrt{1-c^2/c_1^2}} \quad (8)$$

where H is the water depth, c is the sound speed in the water column, and $c_1$ is the sound speed in the half-space seabed. As an example, for a Pekeris wave guide with parameters H=80 m, c=1500 m/s and $c_1$=1650 m/s, the cut-off frequency for mode 2 is calculated to be 46 Hz. This is the minimum required frequency to observe acoustic intensity striations since a minimum of two acoustic modes is needed to produce modal interference. In the presence of an ocean thermocline, a certain group of higher order acoustic modes will be trapped in a near-bottom wave duct if the source is placed below the thermocline. The cut-off frequencies of these trapped modes can also be calculated using a thickness parameter of the near-bottom wave duct in Eq. (8). As an example, for a near-bottom wave duct with parameters h=60 m, c=1500 m/s and $c_1$=1650 ms, the cut-off frequencies for mode 3 and mode 4 can be approximately calculated as 91 Hz and 122 Hz, respectively. Therefore, at frequencies well above the cut-off frequencies, measured acoustic striations patterns for a noise source below the thermocline will be different for receivers located below the thermocline than receivers located above thermocline. This is because the interaction of trapped refracting modes will be dominant below the thermocline, while interaction of reflecting modes will be dominant above the thermocline. If the noise source is above the thermocline, generation of trapped refracting modes in the near-bottom wave duct is not efficient. In this case, measured acoustic striations patterns will be similar for receivers placed below and above thermocline, because the interaction of reflecting modes will be dominant both above and below the thermocline.

It is also possible to determine if a source is above or below the thermocline with a single receiver placed below the thermocline by analyzing the striation patterns within a second frequency band well below the near-bottom-layer cut-off frequencies, thus providing a method of binary decision making. In this case, measured acoustic striations patterns of a noise source below the thermocline will be different at frequency bands above and below cut-off frequencies because the interaction of trapped refracting modes is expected to be dominant above cut-off frequencies and interaction of lower order reflecting modes can be only observed below the cut-off frequencies. If the noise source is above the thermocline, generation of trapped refracting modes in the near-bottom wave duct is not efficient. In this case, measured acoustic striations patterns will be similar for frequency bands below and above near-bottom-layer cut-off frequencies since the interaction of reflecting modes will be dominant both above and below the thermocline.

Considering a broadband noise source moving along a straight track with a constant velocity V, the range to the receiver can be written as $$r=\sqrt{r_0^2+V^2(t-t_0)^2} \quad (9)$$

where $r_0$ is the range at the Closest Point of Approach ("CPA"), and $t_0$ is the time when the source is at the CPA. Then, by integrating Eq. (7), an equation describing the observed acoustic intensity striations (level curves) can be written as $$\omega=\omega_0(1+(V/r_0)^2(t-t_0)^2)^{\beta/2} \quad (10)$$

where the parameters $\beta$, $r_0/V$, $\omega_0$, and $t_0$ describe the observed acoustic intensity level curves. The parameters $r_0/V$, $\omega_0$, and $t_0$, are the same for a moving noise source above or below the thermocline. However, the waveguide invariant parameter $\beta$ will be varying based on the dominance of reflecting modes or refracting modes in the measured acoustic intensity.

Standard Hough Transforms or standard Generalized Radon Transforms can be used to determine the distribution of the depth dependent $\beta$ as well as the ratio of the CPA range to the source speed ($r_0/V$), and the time at CPA ($t_0$). (See, e.g., U.S. Pat. No. 3,069,654 to Hough, which is incorporated herein by reference). A complex global detection problem in the image domain is converted into a more elegant local peak detection problem by means of the Hough Transform. Ideally each point ($\beta$, $r_0/V$, $\omega_0$, $t_0$) in the parameter space is mapped to the integral of intensities in the acoustic intensity time-frequency plots along the curves described by Eq. (10)

$$H(t_0,\beta,r_0/V)=\int L(\omega,t)ds, \quad (11)$$

where $L(\omega,t)$ is the intensity variation ($L(\omega,t)=I(\omega,t)-\bar{I}(t)$) at the point ($\omega,t$) in the acoustic intensity time-frequency plot, and ds is the incremental length along the curves described in Eq. (10). Considering the slowly varying nature of the intensity as a function of range (or time), a time-dependent (only frequency-averaged) mean intensity $\bar{I}_0(t)$ is used to remove the overall trend of transmission loss as a function of range (or time). In Eq. (11), $H(\omega_0,t_0,\beta,r_0/V)$ will be a sinusoidal function of $\omega_0$ when the parameters $\beta$, $r_0/V$, and $t_0$ represent an interference pattern in the acoustic intensity time-frequency plot. The variance (energy) of this sinusoidal is described by parameters $\beta$, $r_0/V$, and $t_0$ in Eq. (10). The total intensity along each curve is squared and normalized by the curve length, and total variance is obtained by summation over $\omega_0$ (representing a family of curves) as $$\overline{H}(t_0, \beta, r_0/V) = \sum_{\omega_0} \frac{\left(\int L(\omega, t)ds\right)^2}{\int ds}. \quad (12)$$

The calculated total variance in three-dimensional parameter space is expected to have a global maximum when the interference pattern is best represented by Eq. (10) with the inverted values of parameters $\beta$, $r_0/V$, and $t_0$. The errors estimating the parameters $r_0/V$ and $t_0$ will be of the same order using two receivers or two frequency bands. Therefore, a robust binary decision making is expected using $\beta$ distributions obtained from two receivers or two frequency bands. FIG. 3 shows illustrative energy level distribution in the $\beta$ parameter space for a noise source below and above the thermocline.

In FIG. 4, normalized $\beta$ distributions can be used to generate Receiver Operating Characteristics ("ROC") curve as a decision theoretic performance metric. (See, e.g., W. W. Peterson, T. G. Birsdall, and W. C. Fox, "The theory of signal detectability," Trans. I.R.E. Professional Group Inf. Theory, PGIT-4, 171-212, 1954, which is incorporated herein by reference). The ROC curves are generated from the probability densities of two hypotheses as $$P_c = \int_\rho^\infty p_{x|H_1}(x|H_1)dx, \quad (13a)$$

and $$P_f = \int_\rho^\infty p_{x|H_0}(x|H_0)dx, \quad (13a)$$

where $P_c$ is the correct classification probability, $P_f$ is the false classification probability, $p_{x|H_1}(x|H_1)$ is the pdf classifier output under hypothesis $H_1$, $p_{x|H_0}(x|H_0)$ is the pdf classifier output under hypothesis $H_0$, and $\rho$ is the threshold. Then, the classifier ROC curve is obtained from cumulative distribution by varying the threshold $\rho$ over the expected range of possible $\beta$ values.

Portions of the invention operate in a computing operating environment, for example, a desktop computer, a laptop computer, a mobile computer, a server computer, and the like, in which embodiments of the invention may be practiced. While the invention is described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. (not shown). Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method comprising:
   providing at least one acoustic sensor located in an ocean layer below an ocean thermocline, the at least one acoustic sensor operating at a first frequency regime and at a second frequency regime, the first frequency regime being above a cut-off frequency of the ocean layer, the second frequency regime being below the cut-off frequency of the ocean layer;
   recording acoustic data from a moving broadband noise source at the at least one acoustic sensor;
   generating a plot of acoustic intensity as a function of frequency versus time from the acoustic data;
   generating a first waveguide invariant density distribution for the first frequency regime and a second waveguide-invariant density distribution for the second frequency regime from the plot using curve detection; and
   classifying whether the noise source is located below the thermocline based on the first waveguide-invariant density distribution and the second waveguide-invariant density distribution.

2. The method according to claim 1, wherein said classifying whether a noise source is located below the thermocline based on the first waveguide-invariant density distribution and the second waveguide-invariant density distribution comprises:
   generating a Receiver Operating Characteristics curve from the first waveguide-invariant density distribution and the second waveguide-invariant density distribution; and
   classifying whether the noise source is located below the thermocline based on the Receiver Operating Characteristics curve.

3. The method according to claim 1, wherein the at least one acoustic sensor comprises one of a plurality of distributed sensors and a horizontal sensor array.

4. The method according to claim 3, wherein the horizontal sensor array is towed by one of a submarine, a ship, and an automated underwater vehicle.

5. The method according to claim 1, wherein the curve detection comprises one of a Radon transform and a Hough transform.

6. The method according to claim 1, wherein the thermocline is located in a body of water on at least one continental shelf.

7. The method according to claim 1, wherein the first waveguide-invariant density distribution comprises a first waveguide-invariant density distribution peak and the second waveguide-invariant density distribution comprises a second waveguide-invariant density distribution peak,
   wherein said classifying whether the noise source is located below the thermocline based on the first waveguide-invariant density distribution and the second waveguide-invariant density distribution comprises assessing a proximity of the first waveguide-invariant density distribution peak to the second waveguide-invariant density distribution peak.

8. A method comprising:
   providing at least one first acoustic sensor located in an ocean layer above an ocean thermocline and at least one second acoustic sensor located in the ocean layer below the ocean thermocline, the at least one first acoustic sensor and the at least one second acoustic sensor operating at a same frequency regime, the frequency regime being above a cut-off frequency of the ocean layer below the ocean thermocline;
   recording acoustic data from a moving broadband noise source at the first acoustic sensor and at the second acoustic sensor;
   generating plots of acoustic intensity as a function of frequency versus time from the acoustic data;
   generating a first waveguide-invariant density distribution for the first acoustic sensor and a second waveguide-invariant density distribution for the second acoustic sensor from the plots using curve detection; and classifying whether the noise source is located below the thermocline based on the first waveguide-invariant density distribution and the second waveguide-invariant density distribution.

9. The method according to claim 8, wherein said classifying whether a noise source is located below the thermocline based on the first waveguide-invariant density distribution and the second waveguide-invariant density distribution comprises:

generating a Receiver Operating Characteristics curve from the first waveguide-invariant density distribution and the second waveguide-invariant density distribution; and classifying whether the noise source is located below the thermocline based on the Receiver Operating Characteristics curve.

10. The method according to claim 8, wherein at least one of the at least one first acoustic sensor and the at least one second acoustic sensor comprises one of a plurality of distributed sensors and a horizontal sensor array.

11. The method according to claim 10, wherein the horizontal sensor array is towed by one of a submarine, a ship, and an automated underwater vehicle.

12. The method according to claim 8, wherein the curve detection comprises one of a Radon transform and a Hough transform.

13. The method according to claim 8, wherein the thermocline is located in body of water on at least one continental shelf.

14. The method according to claim 8, wherein the first waveguide-invariant density distribution comprises a first waveguide-invariant density distribution peak and the second waveguide-invariant density distribution comprises a second waveguide-invariant density distribution peak, wherein said classifying whether the noise source is located below the thermocline based on the first waveguide-invariant density distribution and the second waveguide-invariant density distribution comprises: assessing a proximity of the first waveguide-invariant density distribution peak to the second waveguide-invariant density distribution peak.

* * * * *